May 8, 1945. C. R. ROCHE 2,375,440
AUTOMATIC TRANSMISSION
Filed Dec. 30, 1940
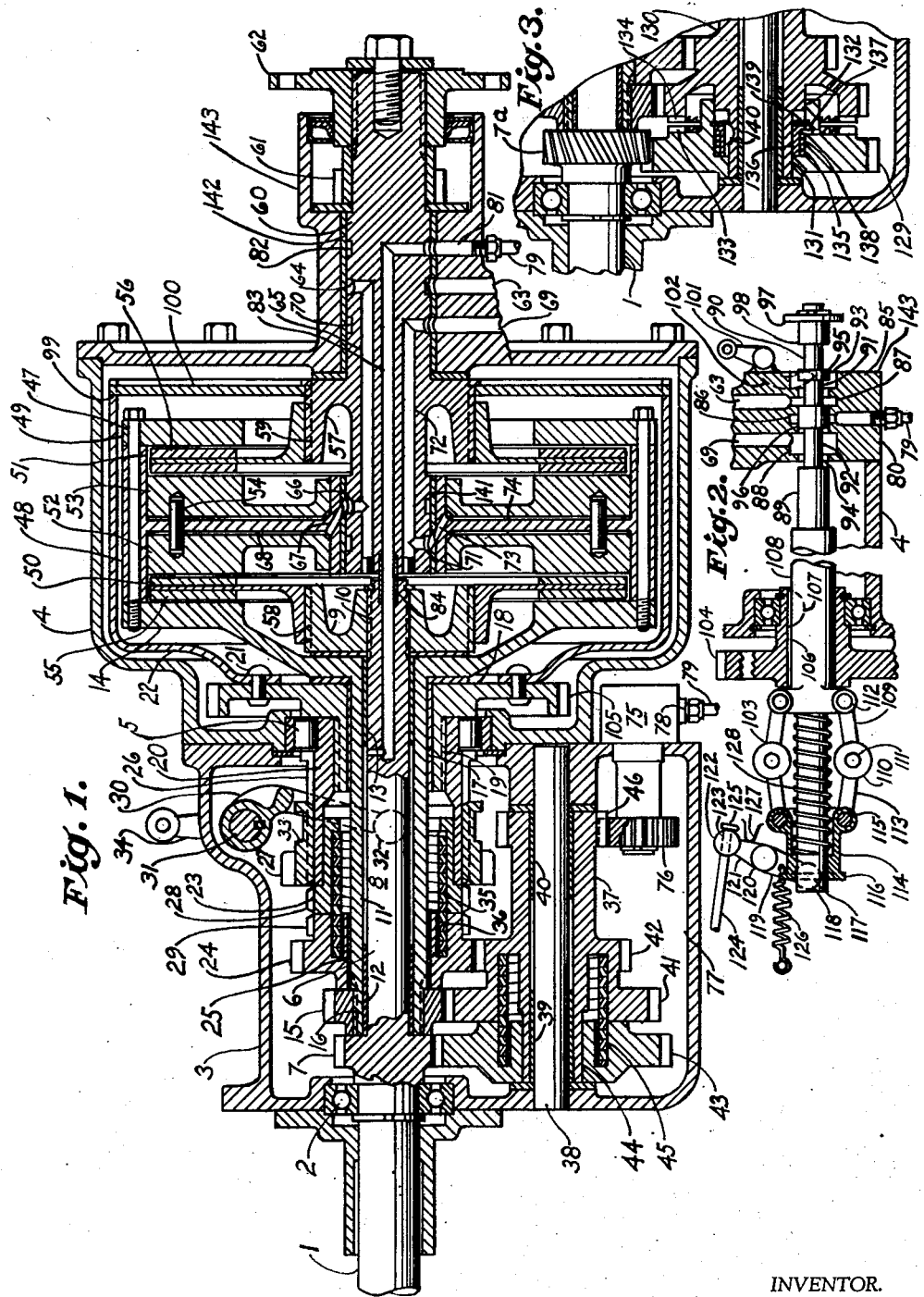
INVENTOR.
Clifton R. Roche Patented May 8, 1945

2,375,440

UNITED STATES PATENT OFFICE 2,375,440

AUTOMATIC TRANSMISSION

Clifton R. Roche, Los Angeles, Calif.

Application December 30, 1940, Serial No. 372,313

12 Claims. (Cl. 74—330)

My invention relates to means for transmitting rotation from one part to another at different speed ratios, and relates particularly to a transmission having especial utility in automotive devices.

My invention is similar to my invention entitled Transmission filed May 13, 1932, Serial Number 611,043, which shows a transmission of this type in simplest form with only two driving ratios, whereas this invention relates to a transmission having four driving ratios, or speeds, and thus can be used in a wider field.

One of the objects of my invention is to provide a transmission of four speed ratios with only three sets of gears, which is no more than the number of sets used in conventional transmissions having only three ratios, also the transmission provides two reverse ratios.

A further object of my invention is to provide a transmission which will automatically shift itself to the proper ratio, making it unnecessary for the operator to use the clutch pedal or shifting lever, after the operator has selected the direction (forward or reverse) he desires.

A further object of my invention is to provide a transmission whose controlling clutches are enclosed in a housing, or compartment, separate from the housing for the gears, and providing accessibility to the clutches so they may be inspected and serviced without tearing down the transmission in general.

A further object of the invention is to provide a transmission that, during the period of shifting from one ratio to another, will shift with continuous power, that is, the power does not have to be disconnected when the shift is made, thereby giving greater acceleration to a vehicle using the transmission.

A further object of my invention is to provide a transmission of simple design, and one which has a conventional type of drive member, or drive shaft, so that it may be installed in an automobile and connected with the conventional automobile engine without changing the conventional flywheel or the conventional clutch of the automobile.

A further object of my invention is to provide an over-riding clutch, or free-wheeling device, of simplified form, utilizing the thrust of a helical gear to shift to a driving condition when the drive comes in one direction, and utilizing this said thrust to shift to an over-riding condition when the drive comes in the other direction.

Further objects and advantages of the invention will be made evident throughout the following part of the specification.

Referring to the drawing which is for illustrative purpose only,

Fig. 1 is a vertically longitudinally sectioned view through a preferred embodiment of my invention.

Fig. 2 is a cross section of the governor and control valve.

Fig. 3 is a fragmentary cross section of the forward end of the main shaft and countershaft shown in Fig. 1, but shows a different type of freewheeling, or over-riding clutch, than is shown in Fig. 1.

Referring to the drawing, my invention includes a drive member 1, which may be a drive shaft of conventional design to fit the conventional clutch member of an automobile engine, rotatively mounted in a bearing 2, carried in a housing 3. Bolted to the housing is a clutch housing 4, which carries a roller bearing 5, in which is rotatively mounted the rear end of a main shaft 6, the forward end of which is the drive member. The parts rotatively mounted in the said bearings 2 and 5, are considered as main shaft parts. The drive member is made to include a first main shaft gear 7, and an extending shaft 8, which carries a clutch hub 9, which is forced to rotate with the drive member by splines 10 cut in the extending shaft.

A free member 11, is mounted on bearings 12 and 13, so as to rotate around the extending shaft, and the rear end of said free member is flanged to a large diameter to form a first clutch member 14. The free member carries a second main shaft gear 15 which is caused to rotate with the free member by the splines 16.

Rotatively mounted on the free member by means of a bearing 17, is a member 18. To this member is fastened, by means of splines 19, a driving collar 20, and also by means of rivets 21, a driving drum 22. Freely turning in the driving collar 20 is a sleeve 23.

A third main shaft gear 24, is rotatively mounted on the free shaft 11, by means of a bearing 25.

On the outer surface of the driving collar 20 are splines or teeth 26. These teeth mesh with internal teeth in a main shaft reverse gear 27. Teeth 28, are located on the outer diameter of the sleeve 23, and like teeth 29, are located on a hub portion of the third main shaft gear 24. The main shaft reverse gear may slide to the left along the teeth of the driving collar 20, so as to lock into the teeth on the sleeve 23, and by sliding still further to the left will also lock into the teeth of the third main shaft gear. In order to obtain the sliding action of the main shaft reverse gear, a yoke 30, is keyed to a shaft 31, and has a projection 32, which fits into a groove 33 around the hub of the main shaft reverse gear. Thus by rocking the shaft 31, the main shaft reverse gear may be moved along the teeth on the driving collar 20, either to the right or to the left from the position shown in Fig. 1. A lever 34, is keyed to the shaft 31 on the outside of the housing 3 so as to control the rocking action of the shaft 31. A remote control may be connected to the lever 34 to be more convenient to the operator.

The third main shaft gear and the sleeve 23 abut against each other, and their inside diameters form a long cylinder 35. In this cylinder is a heavy coil spring 36. If the third main shaft gear is rotated in a clockwise direction when viewed from the left, this spring tends to uncoil, thereby gripping the surface of the cylinder and thereby driving the sleeve 23 from the third main shaft gear. However, if for any reason the sleeve should tend to rotate faster than the third main shaft gear is driving the sleeve, then the spring tends to contract in diameter, thereby breaking the driving connection between the third main shaft gear and the sleeve. This arrangement is a common form of free-wheeling device, or over-riding clutch.

Below the main shaft is a countershaft 37, which rotates on a pin 38, on bearings 39 and 40. The countershaft has a second countershaft gear 41 and a third countershaft gear 42. A first countershaft gear 43, is rotatively mounted on the countershaft by a bearing 44, and a free-wheeling device 45, which may be similar to the one above described, is imposed between the first countershaft gear and the countershaft so that the first countershaft gear can drive the countershaft only when the said gear is driving in a counterclockwise direction when viewed from the left. The first, second, and third countershaft gears mesh with the first, second, and third, main shaft gears respectively. Thus my invention includes a primary driving means, by rotating the countershaft, and any other parts that may be driven by the countershaft, by the first set of gears and the free-wheeling device 45, to rotate the countershaft at a speed proportionate to the speed of the drive member; and a secondary driving means by rotating the countershaft, and any other parts that may be driven by the countershaft, by the second set of gears. Said secondary driving means, due to the relative ratios of the two sets of gears, will rotate the countershaft at a speed greater than the speed at which it is driven through the said primary driving means. When driving through the secondary driving means, the free-wheeling device will override, and a clutch, to be described hereafter, connects the second main shaft gear 15 to the drive member so the said gear 15, and the drive member, will rotate at the same speed. The countershaft also has a countershaft reverse gear 46, which meshes with a reverse idler gear (not shown). The main shaft reverse gear will also mesh with the said reverse idler gear when the main shaft reverse gear is moved to the right from the position shown in Fig. 1.

Bolts 47, fasten a pressure plate container 48, and a second clutch member 49, to the first clutch member 14. The pressure plate container has two large diameter cylinders 50, and 51, into which the pressure plates 52, and 53 are accurately fitted. The pressure plates act as two large diameter pistons and can move axially in the said large diameter cylinders, but are held to rotate with the pressure plate container by pins 54. Two clutch plates 55 and 56, are between the clutch members and the pressure plates so that if pressure is exerted on either of the pressure plates, the clutch plate between that pressure plate and the clutch member will be gripped and forced to rotate with the free member. The first clutch plate 55 is mounted on the clutch hub 9, and the second clutch plate 56 is mounted on a second clutch hub 57, and teeth 58 and 59 on the clutch hubs mesh with internal teeth in the clutch plates. The second clutch hub 59 is a part of a driven member 60 which may drive a speedometer drive gear 61, and a driving flange 62, or other suitable mechanisms. The driving drum 22 has slots 99 to drive a driving plate 100, which has internal teeth that mesh with the teeth 59 on the second clutch hub 57, therefore, rotation of the reverse main shaft gear is directly transmitted to the driven member.

It can now be understood that the free member has a main clutch element which cooperates with a first clutch and a second clutch, and when the first clutch is engaged the free member is caused to rotate with the drive member, and when the second clutch is engaged the free member is caused to rotate with the driven member.

The clutches may be operated by hydraulic pressure. A passageway 63, registers with an annular groove 64 around the driven member, which communicates with a passage 65, in the driven member, which leads to an annular groove 66. This annular groove 66 always communicates with a passage 67, which leads to a compartment 68, which is in the large diameter cylinder and behind the large diameter piston, or pressure plate. Therefore, if fluid under pressure is admitted to the passageway 63, it will force the pressure plate to engage the first clutch. In like manner a second passageway 69, communicates by means of annular grooves 70 and 71, and passages 72 and 73, with a compartment 74. Therefore, if fluid under pressure is admitted to the passageway 69, it will force the second pressure plate to engage the second clutch. The passageways 63 and 69 lead to a control valve 80, which may be located on the side of the transmission, in which case the passageways 63 and 69 in Fig. 1, are not shown in their true angular relation.

The passages 67 and 73 pass through a bearing 141, which allows the pressure plate container 48 to rotate freely on the end of the driven member 60, and the passageways 63 and 69 pass through a bearing 142, in a housing 143, and in which the driven member 60 rotates.

A source of fluid pressure is provided, which may consist of a pump 75, which is driven by a gear 76, which may be driven by the reverse countershaft gear 46. The pump may draw in oil from a sump 77, and have a pressure outlet 78. A pipe line 79, connects the pressure outlet of the pump with the control valve 80, and also connects with a passage 81, which communicates with an annular groove 82, which communicates with a passage 83, which leads to a sleeve 84, which extends into the main shaft, for the purpose of pressure oiling the bearings and parts of the main shaft.

The control valve consists of a valve body 85, with a pressure groove 86, which communicates with the fluid pressure, a first clutch groove 87, which communicates with the passageway 63 which guides the fluid to operate the first clutch, and a second clutch groove 88 which communicates with the passageway 69, which guides the fluid to operate the second clutch; and a valve rod 89, which has three annular grooves 90, 91, and 92. When the valve rod is in the position shown in Fig. 2, both clutches are open, or released, as the passageways 63 and 69 communicate with outlet openings 93 and 94. Suitable arrangement is made to direct any fluid from these outlet openings back into the sump. When the valve rod is moved slightly to the left, the outlet opening 93 will be closed by an enlarged diameter 95 on the valve rod, and the pressure groove 86 will communicate with the first clutch groove 63 through the annular groove 91, thus allowing the fluid pressure to engage the first clutch. When the valve rod is moved still further to the left, the annular groove 90, allows the passageway 63, to communicate with the outlet opening 93, and at the same time the enlarged diameter 95, will prevent communication between the pressure groove 86, and the passageway 63, thereby releasing the first clutch; at the same time the annular groove 91, will allow communication between the pressure groove 86, and the passageway 69, and at the same time an enlarged diameter 96 will close the outlet opening 94, thus engaging the second clutch.

When the valve rod is moved completely to the left, a stop washer 97, comes in contact with the valve body to limit the travel of the valve rod, and when in this position the second clutch remains engaged, but also the first clutch again becomes engaged, as the annular groove 90, is now in a position to allow communication between the pressure groove 86, and the passageway 63, and an enlarged diameter 98, closes the outlet opening 93. Therefore, if the control rod is moved from the position shown in Fig. 2, to the left, the clutches will operate as follows: 1st, both clutches released; 2nd, first clutch engaged, and second clutch released; 3rd, first clutch released, and second clutch engaged; and 4th, both clutches engaged. The operation of the clutches, in the order above described will give 1st, 2nd, 3rd, and 4th speeds for the transmission as will be described later.

To move the valve rod 89, a governor 103 is provided, driven by a governor gear 104, which meshes with a gear 105, that rotates with the driven member. In the hub of the governor gear is a keyway 106 into which projects a key 107, which is held in a governor shaft 108, which may be an extension of the valve rod 89. Rotation of the governor gear will cause rotation of the governor shaft, but the governor shaft may move axially in the governor gear. Links 109 are pinned to the governor shaft and to weights 110, by pins 111 and 112. Links 113 extend from the weights, and are pinned to a bracket 114, by pins 115. The bracket can slide axially on the governor shaft, and is held in position by ring 116, which runs in a slot 117, similar to a screw driver slot, and which is cut in the head of a pin 118, which will turn in the end of a lever 119, and which may be rocked by a shaft 120. The shaft 120 is rocked by a control lever 121, which has a pin 122, with a hole 123, through which passes a control rod 124, with a head 125. A spring 126 is fastened at one end to the housing, and at the other end to the lever 119, to tend to keep the lever and bracket in the extreme left position. A stop 127 locates this position. A governor spring 128, opposes the centrifugal action of the governor weights.

When the governor is rotated, the centrifugal force acting on the weights will move the valve rod to the left, as the bracket 114 is held in the extreme left position by the spring 126. The speeds at which the governor will cause the ratios to change can be varied to suit the operator by moving the control rod 124, so as to shift the position of the bracket 114. When the transmission is used in an automobile, I prefer to connect the control rod 124, with the accelerator pedal of the automobile, in such a way that when the accelerator pedal is depressed, the control rod 124 will be moved to the left.

A more complete description of my governor and control valve, in somewhat more elaborate form, may be found in my former application for Governor for automatic transmission, filed April 23, 1938, Serial Number 203,874.

The operation of the transmission is as follows: When the main shaft reverse gear is in the position shown in Fig. 1, the transmission is in neutral, for if the drive member is rotated, the first main shaft gear rotates the first countershaft gear, which drives the countershaft through the free-wheeling device 45. The second countershaft gear rotates the second main shaft gear, which rotates the free member, but as both clutches are disengaged, the free member can do no driving. The third countershaft gear rotates the third main shaft gear which rotates the sleeve 23 through the free-wheeling device 36, but as the sleeve is free to rotate in the collar 20, there is no rotation transmitted to the driven member, and so the transmission is in neutral.

If the operator wishes to go forward, the lever 34 is moved so as to move the main shaft reverse gear to the left so that its internal teeth will mesh with the teeth 28 of the sleeve 23, thereby locking the sleeve with the reverse gear, which will cause this sleeve to rotate directly with the driven member of the transmission. Now when the drive member is rotated, the countershaft will be rotated by the first set of gears through the countershaft free-wheeling device. The second set of gears will rotate the free member, but as both clutches are disengaged the free member is free. The third set of gears rotates the sleeve 23 through the main shaft free-wheeling device, and as this sleeve is directly connected with the driven member, the driven member will be rotated with a speed reduction or ratio, in respect to the drive member, according to the ratios of the first and third sets of gears. This is first speed. As the speed increases the governor moves the valve rod to the left to where the first clutch will become engaged. This locks the free member to the drive member, so by rotating the drive member the free member will be directly rotated. The free member rotates the second main shaft gear which will rotate the countershaft by the second countershaft gear, the third countershaft gear will rotate the third main shaft gear which will rotate the sleeve 23 through the main shaft free-wheeling device, and thus rotate the driven member according to the ratios of the second and third sets of gears. This is second speed. The drive member will also rotate the first set of gears, but as the first countershaft gear will turn slower than the second countershaft gear, the first countershaft gear will "free-wheel" and have no driving effect.

As the speed increases the governor moves the valve rod further to the left to where the first clutch is disengaged and the second clutch is engaged. This locks the free member to the driven member, so by rotating the drive member the first set of gears will rotate the countershaft through the countershaft free-wheeling device, and the second countershaft gear will rotate the second main shaft gear which is now directly connected to the driven member, and the ratio will be according to the ratios of the first and second sets of gears. This is third speed. The third countershaft gear will also rotate the third main shaft gear but at a slower speed than the second countershaft gear will rotate the second main shaft gear, thus the main shaft free-wheeling device will allow the third main shaft gear to "free-wheel" and thus have no driving effect.

As the speed increases the governor will move the valve rod to the extreme left position which will cause both clutches to become engaged. This will lock the free member to both the drive member and driven member which makes a direct drive, or fourth speed. In this condition the countershaft will be rotated by the second set of gears, and the first countershaft gear will "free-wheel" and have no driving effect. The third countershaft gear will rotate the third main shaft gear which also will "free-wheel" and have no driving effect.

To obtain a reverse, the operator moves the lever 34 so as to shift the reverse gear to the right, which will cause it to mesh with the reverse idler gear. Then when the drive member is rotated, the first set of gears will rotate the countershaft through the countershaft free-wheeling device, the countershaft reverse gear will rotate the reverse idler gear which in turn will rotate the main shaft reverse gear but in opposite direction to the rotation of the drive member. As the speed picks up the governor will move the valve rod to the left, to a position that will cause the first clutch to become engaged. As previously explained, this will cause the countershaft to be rotated by the second set of gears, and as the ratio of the second set of gears is higher than the ratio of the first set of gears, this will give a second speed reverse.

When used in an automobile, it is sometimes desirable to hold the transmission in second gear, and have no free-wheeling. When the operator desires this condition, he moves the lever 34 so as to move the main shaft reverse gear to the extreme left position, causing the internal teeth to mesh with the teeth 29 on the third main shaft gear, which locks out the free-wheeling device. When the lever 34 is moved into this position, or into the position for reverse, a suitable controlling means connects the lever 34 with a lever 101, which rocks a lever 102 to the right, to act against the stop collar 97, so as to limit the travel of the valve rod, only to where the first clutch can become engaged, but not to where the second clutch can become engaged.

When large loads are required, the spring type free-wheeling devices shown in Fig. 1 are not always satisfactory, and other types are complicated and expensive to build, therefore, I have invented a new and useful simple free-wheeling device which is particularly suitable to this transmission when helical gears are used. Referring to Fig. 3, the drive member 1, has a drive gear 7a, with left hand helical teeth, which mesh with a driven gear 129, which rotates on a driven shaft 130 on the bearings 131 and 132. The driven gear can also slide axially on these bearings. A clutch element 133, is on the driven gear, and a companion clutch element 134, is on the driven shaft. When the driven gear is moved to the right the clutch elements become engaged to a driving connection, and when the driven gear is moved to the left the clutch elements become disengaged so that there is no driving connection between the driven gear and the driven shaft. If the drive gear is turned in a clockwise direction, when viewed from the left, the angle of the teeth will cause a thrust to be exerted on the driven gear, forcing it to the right, thus engaging the clutch elements and thereby driving the driven shaft. However, if the driven gear tends to rotate at a greater speed than that which is caused by the speed of rotation of the drive gear, then the thrust due to the angle of the teeth will move the driven gear to the left, disengaging the clutch elements, and thereby allowing the driven gear to "free-wheel."

The engagement and disengagement always occurs when the clutch elements are rotating at substantially the same speeds so that no clash on engagement and disengagement will occur.

If it is desired to obtain a greater thrust to insure a more positive movement of the driven gear to the right and left, a light acting brake 135, may be imposed to resist the turning of the driven gear in respect to the driven shaft. This brake, however, should not cause resistance to the sliding action of the driven gear, and preferably the brake should have little or no braking action when the driven gear is "free-wheeling." To accomplish this, I provide a light coil spring 138, which has one end 137, bent so as to be locked in a hole in the driven gear. The coils of the spring lightly grip the outside surface of a member 136. The member is free to slide in an axial direction with the driven gear, and is held in place by a snap ring 139. The member is held to rotate with the driven shaft by a key 140. The coils of the spring are wound in such a direction that when the relative turning between the driven shaft and the driven gear is in the "free-wheeling" direction, the coils will tend to uncoil offering little or no braking action, but when the relative turning is reversed, the coils tend to tighten around the outer surface of the member 136, causing an appreciable braking action.

It would, of course, be possible to substitute dog type clutches, for the free-wheeling devices and friction type clutches, to obtain a simple four speed transmission, however, the form as shown lends itself more readily to the automatic features.

Although I have shown and described my invention in simple and practical form, it is recognized that certain parts or elements thereof are representative of other parts, elements or mechanisms which may be used in substantially the same manner to accomplish substantially the same results; therefore, it is to be understood that the invention is not to be limited to the details disclosed herein but is to be accorded the full scope of the following claims.

What I claim is:

1. In a transmission mechanism the combination of a drive member, a countershaft, a first gear means for connecting said drive member to said countershaft so as to rotate said countershaft at a speed proportionate to the speed of said drive member, a free member, a second gear means for connecting said countershaft and said free member, a driven member, a third gear means adapted to connect said countershaft and said driven member so as to rotate said driven member at a speed proportionate to the speed of the countershaft, a main clutch element rotatively connected to said free member and engageable with either a first clutch element rotatively connected to said drive member or a second clutch element rotatively connected to said driven member, means for engaging said main clutch element with said first clutch element for connecting said free member to said drive member so as to drive said countershaft through said second gear means at a speed greater than the speed at which said countershaft is driven through said first gear means, and means for engaging said main clutch element with said second clutch element for connecting said free member to said driven member so as to drive said driven member by the countershaft through said second gear means at a speed greater than the speed at which said driven member is driven through said third gear means.

2. In a transmission mechanism the combination of a drive member including a first gear; a free member including a second gear; a driven member; a third gear adapted to drive the driven member; a countershaft including a first gear, a second gear, and a third gear to mesh with the previously mentioned first gear, second gear, and third gear, respectively forming a first set of gears, a second set of gears, and a third set of gears; a main clutch element rotatively connected to said free member and engageable with either a first clutch element rotatively connected to said drive member or a second clutch element rotatively connected to said driven member; means for engaging said main clutch element with either said first clutch element, or said second clutch element for forming a first clutch means, adapted to lock the free member to the drive member; a second clutch means adapted to lock the free member to the driven member; means associated with the first set of gears to prevent a driving connection between the drive member and the countershaft through the first set of gears when the free member is locked to the drive member by said first clutch means causing a driving connection between the drive member and the countershaft through the second set of gears; and means associated with the third set of gears to prevent a driving connection between the countershaft and the driven shaft through the third set of gears when the free member is locked to the driven member by said second clutch means causing a driving connection between the countershaft and the driven member through the second set of gears.

3. In a transmission mechanism the combination of a drive shaft; a countershaft; a first gear means for connecting said drive shaft to said countershaft so as to rotate said countershaft at a speed proportionate to the speed of said drive shaft; a free-wheeling device for rotatively connecting the said first gear means and the said countershaft; a second gear means adapted to connect said drive shaft and said countershaft so as to drive said countershaft at a speed greater than the speed at which said countershaft is driven through said first gear means, said second gear means including a first clutch means adapted to drive said countershaft by said drive shaft through said second gear means when said first clutch means is engaged, and to drive said countershaft by said drive shaft through said first gear means when said first clutch means is disengaged; a driven member; a third gear means for connecting said countershaft to said driven member so as to drive said driven member at a speed proportionate to the speed of said countershaft; a second free-wheeling device having a driving element driven by the said third gear means, and a driven element for driving the said driven member; a second clutch means for the second gear means, adapted to connect said countershaft with said driven member through said second gear means so as to drive said driven member at a speed greater than the speed at which said driven member is driven through said third gear means when said second clutch means is engaged, and to drive said driven member by said countershaft through said third gear means when said second clutch means is disengaged.

4. In a transmission mechanism the combination of a drive member; a countershaft; a first gear means for connecting said drive member to said countershaft so as to rotate said countershaft at a speed proportionate to the speed of said drive member, said first gear means including a free-wheeling device; a second gear means adapted to connect said drive member and said countershaft so as to drive said countershaft at a speed greater than the speed at which said countershaft is driven through said first gear means, said second gear means including a first clutch adapted to drive said countershaft by said drive member through said second gear means when said first clutch is engaged, and to drive said countershaft by said drive member through said first gear means when said first clutch is disengaged; a driven member; a third gear means for connecting said countershaft to said driven member so as to drive said driven member at a speed proportionate to the speed of said countershaft, said third gear means including a free-wheeling device; a second clutch for the second gear means, adapted to connect said countershaft with said driven member through said second gear means so as to drive said driven member at a speed greater than the speed at which said driven member is driven through said third gear means when said second clutch is engaged, and to drive said driven member by said countershaft through said third gear means when said second clutch is disengaged; means to cause engagement and disengagement of said clutches; a governor means having connection with one of said members so as to be controlled by the speed of rotation of such member, and having a controlling means for controlling engagement and disengagement of the said clutches, so as to engage and disengage the said clutches in combinations, in response to speed values of said governor means; direct drive clutch means for locking the second mentioned free-wheeling device to positive drive in both directions; and means associated with said direct drive clutch means and said controlling means for preventing engagement of said second clutch when said direct drive clutch means is in engagement.

5. In a transmission mechanism, the combination of a drive member including a first gear; a free member including a second gear; a driven member; a third gear adapted to drive the driven member; a countershaft including a first gear, a second gear, and a third gear, to mesh with the previously mentioned first gear, second gear, and third gear, respectively, and constituting a first set of gears, a second set of gears, and a third set of gears; a first clutch means adapted to lock the free member to the drive member; a second clutch means adapted to lock the free member to the driven member; a free-wheeling unit associated with the first set of gears for allowing the first set of gears to free-wheel when said first clutch means is engaged; a second free-wheeling unit associated with the third set of gears for allowing the third set of gears to free-wheel when said second clutch means is engaged; a third clutch in parallel with second free-wheeling unit; means to lock out at will said second free-wheeling unit by engagement of said third clutch; and means to prevent the engagement of said second clutch means when said third clutch is engaged.

6. In a transmission the combination of a drive member, a free member, a driven member, gears for each of the above mentioned members, a housing for enclosing therein the gears, a countershaft, gears for the countershaft to mesh with the above mentioned gears, a clutch housing, a main clutch element within said clutch housing, a member extending between the two above mentioned housings for rotatively connecting said main clutch element and the gear for said free member, a first clutch element connected to said drive member and cooperating with said main clutch element for forming a first clutch means for rotating the said free member at the same speed as the drive member, a second clutch element connected to said driven member and cooperating with said main clutch element for forming a second clutch means for rotating the said free member at the same speed as the driven member, and means to engage and disengage said clutches for obtaining various speed ratios for the transmission.

7. In a transmission the combination of a drive member, a driven member, a free member, gears for each of the above mentioned members, a countershaft, gears for the countershaft to mesh with the above mentioned gears, a main clutch element connected to said free member, two thrust surfaces for the said main clutch element, two pressure plates for the said main clutch element, a first clutch element located between one of said thrust surfaces and one of said pressure plates and connected to the said drive shaft, a second clutch element located between the other of said thrust surfaces and the other of said pressure plates and connected to the said driven member, pressure means for actuating each pressure plate for causing the pressure plate to force its corresponding clutch element against its corresponding thrust surface, and means for controlling said pressure means for actuating either pressure plate separately or both pressure plates at the same time for connecting either the said drive member, or said driven member, or both the said drive member and the said driven member, with the said free member for obtaining various speed ratios for the transmission.

8. In a transmission the combination of a drive member, a driven member, a free member, gears for each of the above mentioned members, a countershaft, gears for the countershaft to mesh with the above mentioned gears, a main clutch element connected to said free member, two thrust surfaces for the said main clutch element, two pressure plates for the said main clutch element, a first clutch element located between one of said thrust surfaces and one of said pressure plates and connected to the said drive shaft, a second clutch element located between the other of said thrust surfaces and the other of said pressure plates and connected to the said driven member, fluid pressure means for actuating each pressure plate for causing the pressure plate to force its corresponding clutch element against its corresponding thrust surface, a source of fluid pressure, and means for controlling said fluid pressure to said fluid pressure means for actuating either pressure plate separately or both pressure plates at the same time for connecting either the said drive member, or the said driven member, or both the said drive member and the said driven member, with the said free member for obtaining various speed ratios for the transmission.

9. In a transmission the combination of a first gear, a forward shaft and a rear shaft extending from said first gear, the said forward shaft serving as a drive member for the transmission, a second gear, a tubular shaft extending from the said second gear and surrounding the said rear shaft, a main clutch element rotatively connected to said tubular shaft, a first clutch element rotatively connected to the said rear shaft and cooperating with the said main clutch element for forming an engageable and disengageable first clutch for connecting in driving relation the said driving member with the said second gear, a driven member for the transmission, a second clutch element rotatively connected to the said driven member and cooperating with the said main clutch element for forming an engageable and disengageable second clutch for connecting in driving relation the said driven member with the said second gear, a third gear rotatively connected with the said driven member, a gear means for connecting in driving relation the said first, second, and third gears, and means to engage and disengage the said clutches for obtaining various speed ratios for the transmission.

10. In a transmission the combination of a drive member, a gear train driven by said drive member, a driven gear driven by said gear train, a reverse idler gear driven by said gear train, a driving element of a free-wheeling unit driven by said driven gear, a first element of a direct drive clutch also driven by the said driven gear, a driven element of the free-wheeling unit, a second element of said direct drive clutch capable of rotation as a unit with the driven element of the free-wheeling unit, a driven member for the transmission, a third element of said direct drive clutch rotatively connected to the said driven member and capable of axial movement for engaging with the second element of the said direct drive clutch, and also for engaging with the first element of the said direct drive clutch, for causing the said driven gear to drive the said driven member through the free-wheeling unit or for bridging the drive past the free-wheeling unit, a gear carried by the said third element of said direct drive clutch and capable of meshing with the said reverse idler gear, for reversing the direction of said driven member, and means for shifting the said third element to positions for engaging the first and the second element of said direct drive clutch as aforesaid or for shifting to position for meshing the said gear carried by the said third element with the said reverse idler gear, and means for shifting the said third element to positions for engagements as aforementioned.

11. In a transmission mechanism the combination of a drive member, a countershaft, a first gear means for connecting said drive member to said countershaft so as to rotate said countershaft at a speed proportionate to the speed of said drive member, a free member, a second gear means for connecting said countershaft to said free member, a driven member, a third gear means for connecting said countershaft and said driven member so as to rotate said driven member at a speed proportionate to the speed of the countershaft, a main clutch element rotatively connected to said free member and including means for engaging and disengaging itself with either a first clutch element rotatively connected to said drive member or a second clutch element rotatively connected to said driven member, for connecting said free member to said drive member so as to drive said countershaft through said second gear means at a speed greater than the speed at which said countershaft is driven through said first gear means when said main clutch element is engaged with said first clutch element, and for connecting said free member to said driven member so as to drive said driven member by the countershaft through said second gear means at a speed greater than the speed at which said driven member is driven through said third gear means when said main clutch element is engaged with said second clutch element.

12. In a transmission mechanism the combination of a drive member including a first gear; a free member including a second gear; a driven member; a third gear adapted to drive the driven member; a countershaft including a first gear, a second gear, and a third gear, to mesh with the previously mentioned first gear, second gear, and third gear, respectively forming a first set of gears, a second set of gears, and a third set of gears; a main clutch element rotatively connected to said free member and including means for engaging and disengaging itself with either a first clutch element rotatively connected to said drive member or a second clutch element rotatively connected to said driven member for forming a first clutch means adapted to lock the free member to the drive member and a second clutch means adapted to lock the free member to the driven member; means associated with the first set of gears to prevent a driving connection between the drive member and the countershaft through the first set of gears when the free member is locked to the drive member by said first clutch means causing a driving connection between the drive member and the countershaft through the second set of gears; and means associated with the third set of gears to prevent a driving connection between the countershaft and the driven shaft through the third set of gears when the free member is locked to the driven member by said second clutch means causing a driving connection between the countershaft and the driven member through the second set of gears.

CLIFTON R. ROCHE.